United States Patent
DeLoach et al.

(10) Patent No.: US 7,050,788 B2
(45) Date of Patent: May 23, 2006

(54) METHODS, SYSTEMS, AND STORAGE MEDIUMS FOR FACILITATING A BILLING POINT OF INTERCONNECTION IN A TELECOMMUNICATIONS ENVIRONMENT

(75) Inventors: William DeLoach, Newnan, GA (US); Edgar Honeycutt, Suwanee, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 243 days.

(21) Appl. No.: 10/850,605

(22) Filed: May 20, 2004

(65) Prior Publication Data
US 2005/0260971 A1    Nov. 24, 2005

(51) Int. Cl.
*H04M 11/00* (2006.01)

(52) U.S. Cl. .............. 455/406; 455/414.1; 379/114.28; 379/115.01

(58) Field of Classification Search ................ 455/403, 455/406, 414.1; 379/114.03, 114.05, 114.08, 379/114.09, 114.2–22, 114.28, 115.01
See application file for complete search history.

(56) References Cited

U.S. PATENT DOCUMENTS

| | | | |
|---|---|---|---|
| 5,805,688 A * | 9/1998 | Gillespie et al. ....... | 379/221.08 |
| 6,078,946 A * | 6/2000 | Johnson ...................... | 709/200 |
| 6,285,748 B1 * | 9/2001 | Lewis ................... | 379/112.01 |
| 6,490,620 B1 * | 12/2002 | Ditmer et al. .............. | 709/224 |
| 6,611,867 B1 * | 8/2003 | Bowman-Amuah ......... | 709/224 |
| 6,714,632 B1 * | 3/2004 | Joyce et al. ............. | 379/114.2 |
| 2005/0074101 A1 * | 4/2005 | Moore et al. .......... | 379/114.01 |

* cited by examiner

*Primary Examiner*—CongVan Tran
(74) *Attorney, Agent, or Firm*—Cantor Colburn LLP

(57) ABSTRACT

Exemplary embodiments of the invention include methods, systems, and storage mediums for facilitating a billing point of interconnection in a telecommunications environment. The method includes establishing a billing point of interconnection for a communications network. The communications network is serviced by an incumbent local exchange carrier and at least one competitive local exchange carrier. The method also includes monitoring traffic occurring on the communications network. For incumbent local exchange carrier-generated traffic that exceeds a pre-defined threshold, the method includes calculating an amount of traffic usage in excess of the pre-defined threshold. The amount of traffic usage calculated reflects traffic occurring between the billing point of interconnection and a physical point of interconnection. The method also includes billing the competitive local exchange carrier for dedicated transport facilities between the Billing Point of Interconnection and a physical Point of Interconnection where traffic usage is in excess of the pre-defined threshold.

20 Claims, 4 Drawing Sheets

Billing Point of Interface Summary Report 400

TUE 01 JUL 2003 to TUE 30 SEP 2003

Carriers Included: ALL
States Included: ALL

Calling State: AL
Carrier: ABC

| Carrier Name | LATA | BPOI Name | Originating CLLI | Terminating CLLI | DS3 Count | September MOU | MOU above Threshold | DS3 Count | August MOU | MOU above Threshold | DS3 Count | July MOU | MOU above Threshold |
|---|---|---|---|---|---|---|---|---|---|---|---|---|---|
| ABC | 438 | Undef BPOI | LGRNGAMA88C | ATLNGADKGM5 | 0 | 0 | 0 | 0 | 0 | 0 | 0 | 10,886 | 10,886 |
| | | | *Grand Total for ATLNGADKGM5* | | *0* | *0* | *0* | *0* | *0* | *0* | *0* | *10,886* | *10,886* |
| ABC | 438 | Undef BPOI | BWDNGAMARS1 | ATLNGADKGM6 | 0 | 0 | 0 | 0 | 0 | 0 | 0 | 3,149 | 3,149 |
| ABC | 438 | Undef BPOI | TLLPGAESS57F | ATLNGADKGM6 | 0 | 0 | 0 | 0 | 0 | 0 | 0 | 1,997 | 1,997 |
| | | | *Grand Total for ATLNGADKGM6* | | *0* | *0* | *0* | *0* | *0* | *0* | *0* | *5,146* | *5,146* |
| ABC | 438 | Undef BPOI | BWDNGAMARS1 | BRHMAL13RM1 | 0 | 0 | 0 | 0 | 2 | 2 | 0 | 0 | 0 |
| | | | *Grand Total for BRHMAL13RM1* | | *0* | *0* | *0* | *0* | *2* | *2* | *0* | *0* | *0* |
| | | *Grand Total for ABCLATA 438: Undef BPOI* | | | *0* | *0* | *0* | *0* | *2* | *2* | *0* | *16,032* | *16,032* |
| ABC | 438 | ABC BRMNGAESS53A | BWDNGAMARS1 | ATLNGADKGM6 | 0 | 5,159 | 5,159 | 0 | 7,342 | 7,342 | 0 | 0 | 0 |
| | | | *Grand Total for ATLNGADKGM6* | | *0* | *5,159* | *5,159* | *0* | *7,342* | *7,342* | *0* | *0* | *0* |
| | | *Grand Total for ABCLATA 438: UTC-BRMNGAESS53A* | | | *0* | *5,159* | *5,159* | *0* | *7,342* | *7,342* | *0* | *0* | *0* |
| ABC | 438 | ABC LGRNGAMA88C | LGRNGAMA88C | ATLNGADKGM5 | 0 | 9,329 | 9,329 | 0 | 20,958 | 20,958 | 0 | 0 | 0 |
| | | | *Grand Total for ATLNGADKGM5* | | *0* | *9,329* | *9,329* | *0* | *20,958* | *20,958* | *0* | *0* | *0* |
| | | *Grand Total for ABCLATA 438: UTC-LGRNGAMA88C* | | | *0* | *9,329* | *9,329* | *0* | *20,958* | *20,958* | *0* | *0* | *0* |
| ABC | 438 | ABC PHCYALFMYS0 | PHCYALFMYS0 | ATLNGADKGM5 | 0 | 0 | 0 | 0 | 50 | 50 | 0 | 0 | 0 |
| ABC | 438 | ABC PHCYALMADS0 | PHCYALMADS0 | ATLNGADKGM5 | 0 | 0 | 0 | 0 | 162 | 162 | 0 | 0 | 0 |
| | | | *Grand Total for ATLNGADKGM5* | | *0* | *0* | *0* | *0* | *212* | *212* | *0* | *0* | *0* |

FIG. 4

METHODS, SYSTEMS, AND STORAGE MEDIUMS FOR FACILITATING A BILLING POINT OF INTERCONNECTION IN A TELECOMMUNICATIONS ENVIRONMENT

BACKGROUND OF INVENTION

The present invention relates generally to telecommunications services, and more particularly, to methods, systems, and storage mediums for facilitating a billing point of interconnection arrangement in a telecommunications environment.

Incumbent local exchange carriers (ILECs) refer to well-established telecommunications service providers that have typically been in operation before the government-imposed deregulation laws were effectuated. Since that time, many competitive local exchange carriers (CLECs) have attempted to gain market presence within the traditionally ILEC-controlled geographies. These CLECs incur significant costs associated with equipment installation and building new facilities necessary for conducting its telecommunications services. For start-up CLECs without adequate capital resources, these costs can be prohibitively significant. These competitors typically enter into agreements with ILECs for handling interconnection calling services, such as, for example, when a CLEC end user calls an ILEC end user whereby both the ILEC's and CLEC's equipment and transmission lines are accessed.

The physical interconnection point between the ILEC and CLEC networks is referred to as a point of interconnection (POI). When a CLEC negotiates a POI location at which to physically interconnect its network with that of the ILEC, it ideally desires to locate the POI as close as possible to its end office switch so that the distance between the end office and physical point of interconnection is minimal, thereby shifting the burden and costs of transmission to the ILEC. Obviously, the ILEC would prefer that the CLEC agree to locate the POI further into the ILEC network so that the ILEC is not required to handle an unfair portion of the total end-to-end transmission requirement.

What is needed, therefore, is a way for both the ILEC and CLEC to economically benefit and share, more equally, the costs associated with the completion of end user customer calls that traverse the physical point of interconnection between the ILEC and the CLEC networks.

SUMMARY OF INVENTION

The above-stated disadvantages and deficiencies are overcome or alleviated by methods, systems, and storage mediums for facilitating a Billing Point of Interconnection (BPOI) in a telecommunications environment. Methods include establishing a billing point of interconnection for a communications network. The communications network is serviced by an incumbent local exchange carrier and at least one competitive local exchange carrier. Methods also include monitoring traffic occurring on the communications network. For incumbent local exchange carrier-generated traffic that exceeds a pre-defined threshold, methods include calculating traffic usage in excess of the pre-defined threshold. The amount of traffic usage calculated reflects traffic occurring between the designated Billing Point of Interconnection and a physical Point of Interconnection. Methods also include billing the competitive local exchange carrier for dedicated transport between the physical POI and the BPOI after the pre-defined usage threshold has been achieved.

Systems include a server executing a monitor application and a Billing Point Of Interconnection application. The monitor application monitors network traffic occurring on a telecommunications network. Systems also include a data repository in communication with the server. The data repository stores summary tables and usage reports. Systems further include a link to an incumbent local exchange carrier end office that services the telecommunications network and a link to a competitive local exchange carrier end office that also services the telecommunications network. The billing point of interconnection application establishes a billing point of interconnection for the telecommunications network and, in response to the traffic monitoring, for incumbent local exchange carrier-generated traffic that exceeds a pre-defined threshold, calculates an amount of traffic usage in excess of the pre-defined threshold. The traffic usage calculation reflects traffic occurring between the billing point of interconnection and a physical point of interconnection.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 4 is a portion of a sample summary report produced by the billing point of interconnection system in exemplary embodiments.

DETAILED DESCRIPTION

The billing point of interconnection (BPOI) system is a transport option available to competitive local exchange carriers (CLECs). The BPOI system includes one or more dedicated DS3 transport facilities that connect a BPOI to a physical POI. A dedicated DS3 transport refers to a high-capacity, digital transmission path that is dedicated to the use of the ordering CLEC in its provisioning of local exchange and associated exchange access services. In accordance with pre-established agreement terms, a BPOI is established within the ILEC network, which enables an incumbent local exchange carrier (ILEC) to recoup it's network costs incurred when CLEC customer associated calling from or to the BPOI exceeds a predefined threshold.

A BPOI, as opposed to physical POI, refers to a virtual or billing point of interconnection (BPOI). It defines the point in the ILEC network at which interoffice dedicated transport will be measured from the physical POI for which the CLEC agrees to pay the ILEC for use in the completion of local and ISP-bound traffic over ILEC facilities. The BPOI may be established at any point in the ILEC local calling area at which the pre-defined usage threshold has been met.

A physical point of interconnection (POI) refers to the physical telecommunications interface or point at which the WLEC and the CLEC networks interconnect. It serves as both the technical interconnection point and the point of operational responsibility. It also defines the point at which the ILEC and CLEC's call transport, termination, and reciprocal compensation responsibility begins.

Figure 1:
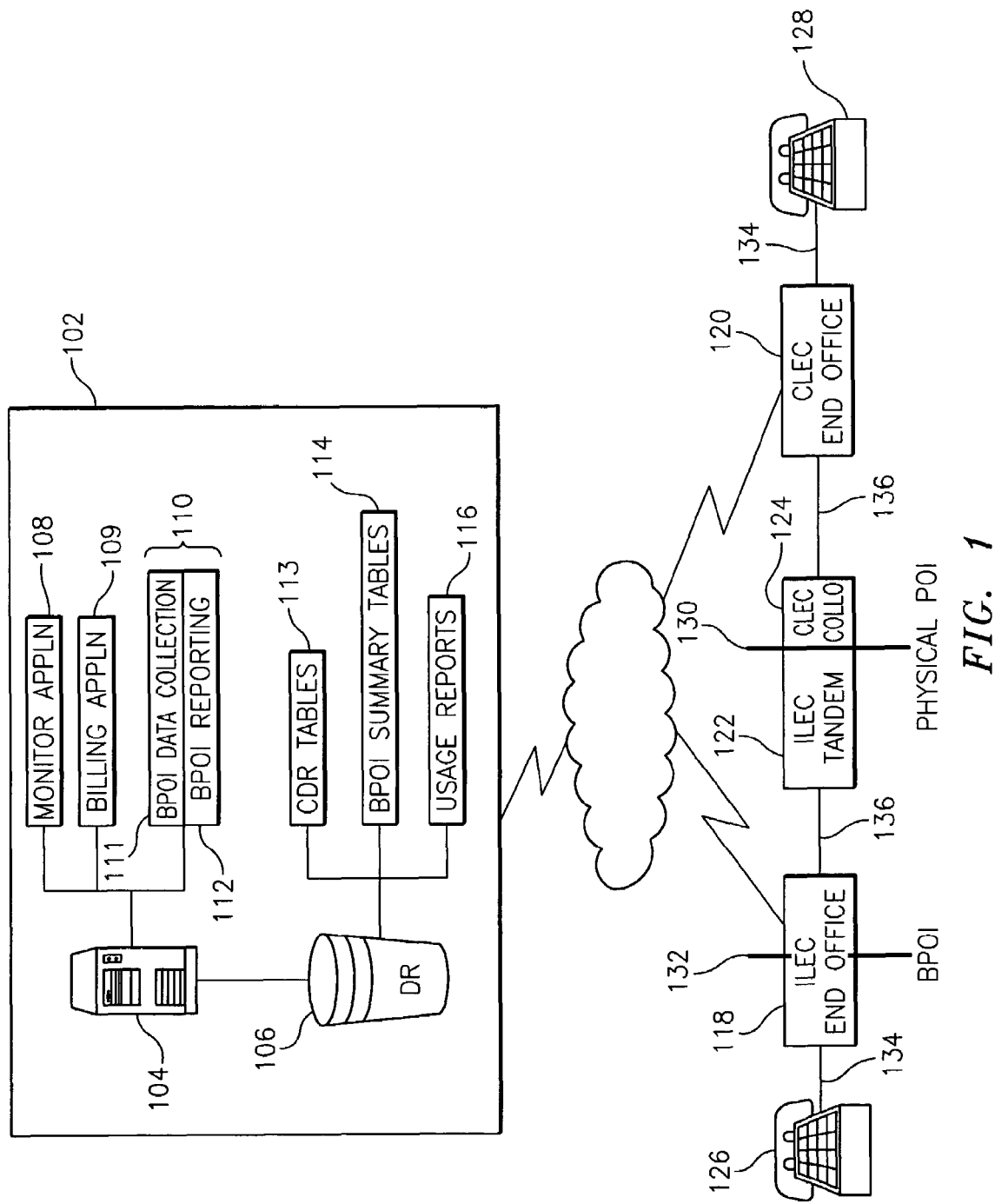
FIG. 1 is a block diagram of a portion of a system upon which the billing point of interconnection system may be implemented in exemplary embodiments.

Referring now to FIG. 1, a portion of a system upon which the billing point of interconnection system may be implemented will now be described. FIG. 1 includes a host system 102 which may be a service provider entity such as a telephone service provider, Internet service provider, or other similar entity. In alternative embodiments, host system 102 may be an application service provider that provides the services of the billing point of interconnection system for one or more service providers under an agreement.

Host system 102 includes a server 104 in communication with a data repository 106. Server 104 executes monitor application 108, a billing application 109, and the billing point of interconnection system 110 (also referred to herein as BPOI system), which in turn, comprises a data collection component 111 and a reporting component 112. Data collection component 111 and reporting component 112 further include a spreadsheet application. Server 104 may execute other applications typically associated with a service provider as well. Server 104 may comprise a high-powered personal computer or mainframe computer capable of handling the volume of call monitoring and data collection/processing activities as described further herein. Data collection component 111 and reporting component 112 are described further herein. Monitor application 108 monitors transmissions occurring between established ILEC and CLEC end offices and determines call volumes resulting therefrom. Monitor application 108 may be a commercial application or may include proprietary or legacy product. Data repository 106 stores call detail record tables 113, billing point of interconnection summary tables 114, and usage reports/bills 116. Call detail record tables 113 are produced by monitor application 108 and include call volumes and associated information regarding calling activities conducted by its customers. Summary tables 114 are produced by the BPOI system 110 and provide BPOI and non-BPOI usage information for all carriers (CLECs). Usage reports 116 are produced by the BPOI system 110 and provide each carrier with a report of its usage for a billing period.

FIG. 1 also includes an Independent Local Exchange Carrier (ILEC) end office 118 in communication with an ILEC tandem 122 via a transmission medium 136. ILEC tandem 122 is, in turn, in communication with a Competitive Local Exchange Carrier (CLEC) end office 120 via a transmission medium 136. ILEC end office 118 refers to a switching center, or wire center, operated by the ILEC. End office 118 houses equipment used to process calls and data traffic.

Likewise, CLEC end office 120 refers to a switching center operated by the CLEC, which also houses equipment for processing calls and data traffic. ILEC tandem 122 refers to a system that connects traffic between two trunks or switching systems. A CLEC facility at the collocation space 124 is connected to the ILEC tandem 122. Through collocation space 124, CLEC end office 120 is connected to ILEC tandem 122. The ILEC and CLEC network service area may comprise an entire local access transport area (LATA) established for servicing a particular geographic region or some portion of an entire LATA.

ILEC end office 118 and CLEC end office 120 are in communication with host system 102 via a network system such as the Internet.

FIG. 1 also includes end user devices 126 and 128, which refer to communications devices operated by customers of the ILEC and CLEC, respectively. While end user devices 126 and 128 are shown to each comprise a wireline telephone, it will be understood by those skilled in the art that end user devices 126 and 128 may comprise other communications devices such as a general-purpose computer, laptop, or other device. Devices 126 and 128 are in communication with end offices 118 and 120, respectively, via cable wires, or loops 134.

Figure 2:
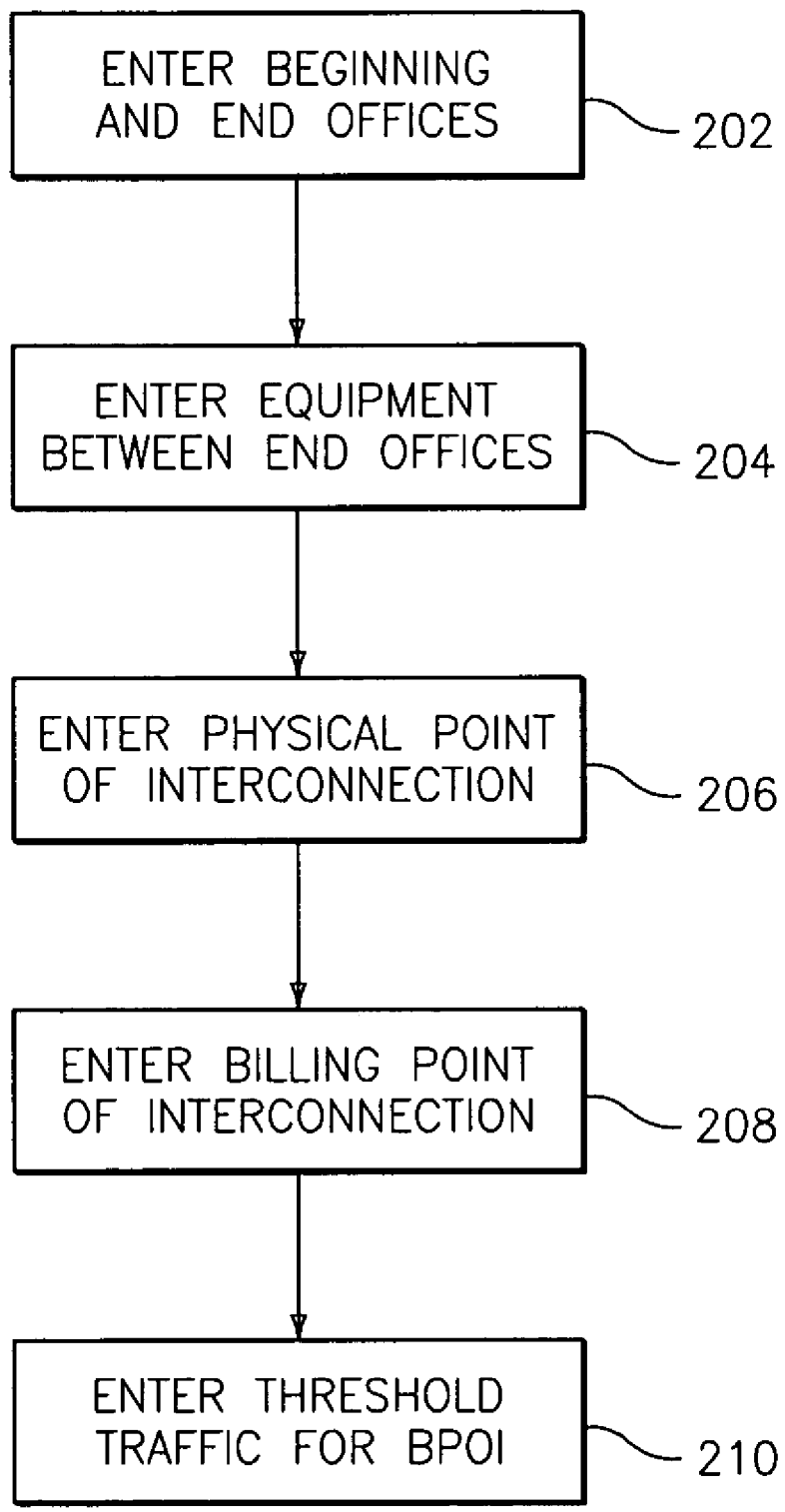
FIG. 2 is a flowchart describing a process for setting up the billing point of interconnection system in exemplary embodiments.

The BPOI system 110 enables ILECs and CLECs to establish a billing point of interconnection that is separate from the physical point of interconnection within the network in order to balance the costs and burdens associated with providing communications services to their customers. Samples of a billing point of interconnection 132 and a physical point of interconnection 130 are shown in FIG. 1. These are further described herein. The BPOI system is initiated or set up after negotiations between a CLEC and ILEC have been conducted and a BPOI agreement reached. The BPOI set-up process of FIG. 2 is initiated either subsequent to these negotiations or upon modification of the agreement.

At step 202, the beginning and endpoints (e.g., end office 118 and the POI 130) are identified and entered into BPOI system 110. Any equipment, tandems (e.g., 122), transmission lines (e.g., 136), etc. between these endpoints are identified and entered into BPOI system 110 at step 204. At step 206, the physical point of interconnection (POI) (e.g., 130), between the two carriers' end offices 118 and 120 is identified and entered into BPOI system 110. At step 208, the agreed upon billing point of interconnection (e.g., 132) is entered into BPOI system 110. A usage threshold that determines when BPOI 132 will be activated is entered into the BPOI system 110 at step 210. This process is separate for and may be repeated for each CLEC associated with the ILEC and for each BPOI arrangement the ILEC may have for a given CLEC, as needed. An example of a BPOI threshold may include a specified number of 'minutes of use' (MOU) that, once reached, activates BPOI 132 whereby the CLEC then pays the costs of transmission for calls between POI 130 and BPOI 132. For example, according to monitor application 108, ILEC customers calling customers of a monitored CLEC have reached an agreed threshold of 8.9 million MOU per month for three consecutive months. The DS3 dedicated transport facility mileage (i.e., transmission between BPOI 132 and POI 130) for each increment of 8.9 million MOUs would then be billed to the CLEC.

BPOI system 110 may be utilized in conjunction with an existing monitor application 108 and may be designed as a plug-in application to the existing monitor application 108. Alternatively, the BPOI system 110 may perform the monitoring activities in lieu of monitor application 108 along with the functions recited herein.

Figure 3:
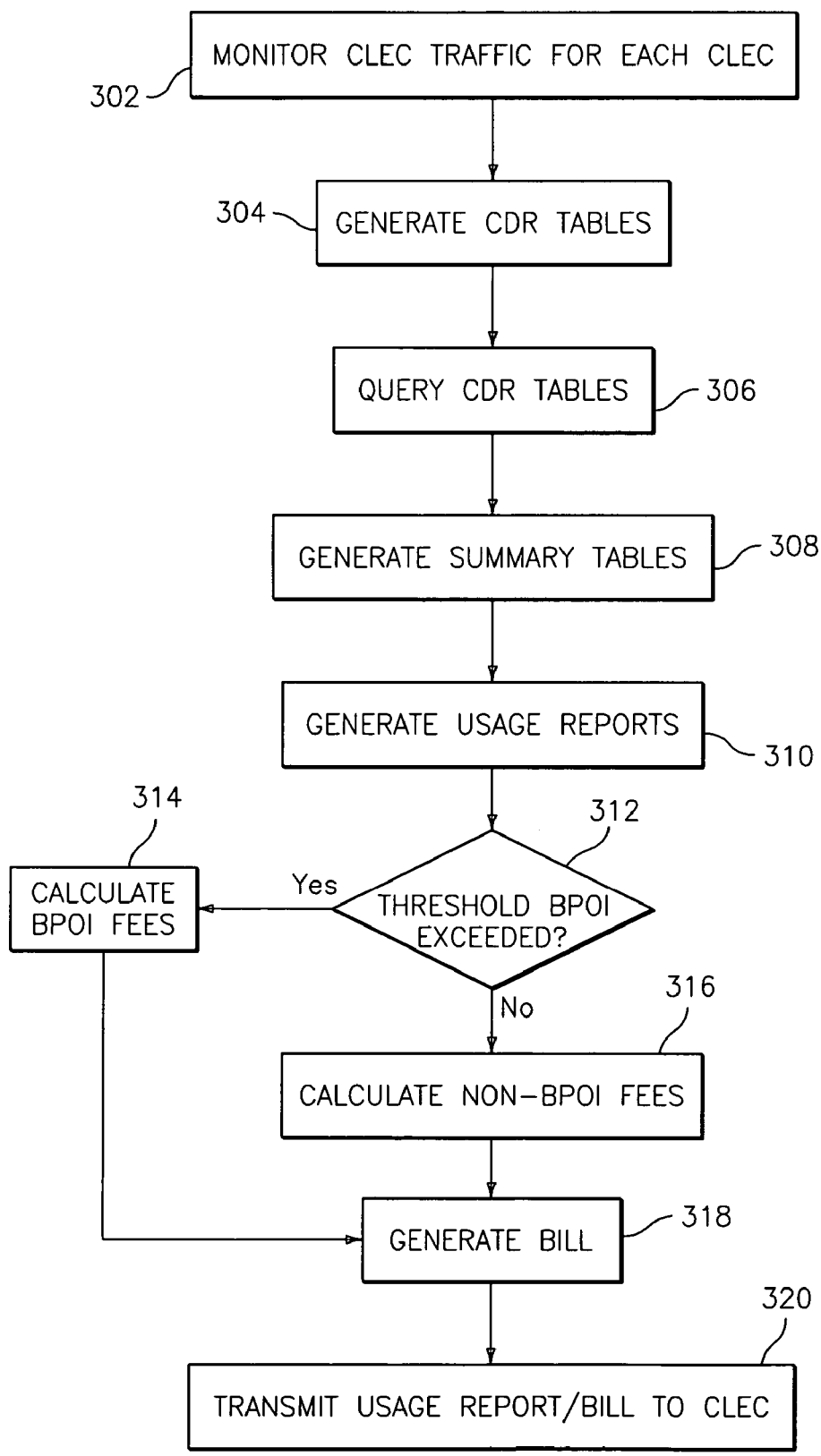
FIG. 3 is a flowchart describing a process for implementing the billing point of interconnection system in exemplary embodiments.

Referring now to FIG. 3, implementation of the BPOI system 110 will now be described. At step 302, CLEC traffic occurring between end office 118 and the POI 130 is monitored. From this monitoring, call detail reports are generated at step 304 and stored in data repository 106. The BPOI data collection component 111 queries call detail records at step 306 for usage information applicable to the threshold agreement. These queries may be Structured Query Language (SQL) queries. From these queries, the resulting data is placed in a summary table at step 308, a sample of which is shown in FIG. 4. The BPOI reporting component 112 generates usage reports 116 from the summary tables 114 at step 310. The usage reports illustrate the aggregated usage for the list of monitored CLECs. Further, the usage reports separate the BPOI usage from the non-BPOI usage. At step 312, it is determined from the usage reports whether the BPOI usage has exceeded the threshold. If so, BPOI system 110 calculates the fees for the dedicated transport associated with this BPOI usage at step 314 and enters the fees in a bill via billing application 109 at step 318. At step 320, the bill and usage report 116 are transmitted to the CLEC. If the BPOI threshold 132 has not been exceeded at step 312, BPOI system 110 generates a bill for the non-BPOI usage at step 318 and transmits the bill and the usage report 116 to the CLEC at step 320.

The BPOI reporting component 112 enables users to sort results of call detail record queries by area, by CLEC, by date range, and by other criteria. As shown in FIG. 4, a portion of a sample summary report 400 illustrates usage information for a carrier "ABC Co." within the state of Alabama during the months of July through September of 2003. The information may be further broken down by LATA. The summary report shows minutes of use (MOU) incurred above the agreed upon threshold for each month.

A BPOI may be entered into a CLEC contract that allows the CLEC to initially establish a single physical POI within a LATA. As the originating ILEC and/or CLEC terminating traffic from all points within the LATA grows, the CLEC may be required to establish additional POIs when traffic from a given area within the LATA ramps up to a DS3 traffic level (i.e., 8.9M minutes of use). This 'given area' within a LATA may be as small as one end office or comprise a larger geographically relevant area such as a local calling area or access tandem serving area. Network entities monitor the traffic and, upon determining that the 8.9M minutes of use threshold has been reached, notify a product manager, who may in turn, notify the CLEC.

To satisfy the additional POI requirement, the CLEC may be given the option to build facilities to the new physical POI location or by utilizing the BPOI agreement and obtaining BPOI transport from the ILEC. If the CLEC chooses to utilize the BPOI and, at some point after BPOI has been implemented, believes the average quarterly traffic volume has dropped below the 8.9M minutes of use threshold or other threshold set, the CLEC may query a local account manager for direction. The local account manager obtains direction from the network capacity managers as to whether the traffic has dropped below the 8.9M minutes of use threshold and, if so, takes steps to have the BPOI charges stopped.

In some agreements, there may be additional caveats build into the requirements for the provision of BPI. For example, there may be a mileage requirement indicating that an additional POI is required only if the CLEC is a specified number of miles from an existing POI. Such caveats are typically discussed and agreed upon in the negotiations process. These caveats, however, serve to establish additional thresholds as to when additional POIs are required without changing the provision of the BPOI transport agreement.

As described above, the BPOI system allows a CLEC to maintain a single physical POI within a LATA without having to expend the additional capital necessary to build additional transport facilities necessary to establish additional physical POIs further into the ILEC network. The ILEC, in turn, recovers its transport costs for transporting ILEC-originated traffic to the physical POI after the threshold has been met.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, , such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for facilitating a billing point of interconnection in a telecommunications environment, comprising:
    establishing a billing point of interconnection for a communications network, said communications network serviced by an incumbent local exchange carrier and at least one competitive local exchange carrier;
    monitoring traffic occurring on said communications network; and
    for incumbent local exchange carrier-generated traffic that exceeds a pre-defined threshold:
        calculating an amount of traffic usage in excess of said pre-defined threshold; wherein said calculating an amount of traffic usage reflects traffic occurring between said billing point of interconnection and a physical point of interconnection; and
        billing said competitive local exchange carrier for dedicated transport for facilities between said Billing point of interconnection and physical point of interconnection where said traffic usage exceeds said pre-defined threshold.

2. The method of claim 1, wherein said billing point of interconnection comprises a delivery point of incumbent local exchange carrier-originated traffic to said competitive local exchange carrier; wherein said competitive local exchange carrier has agreed to pay said incumbent local exchange carrier for interoffice dedicated transport.

3. The method of claim 1, wherein said physical point of interconnection comprises a physical telecommunications interface between said incumbent local exchange carrier and said competitive local exchange carrier.

4. The method of claim 1, wherein said pre-defined threshold comprises a specified number of minutes of use per month over a consecutive 3-month period relating to said traffic.

5. The method of claim 1, further comprising:
generating a summary report resulting from said monitoring, said summary report including billing point of interconnection usage and non-billing point of interconnection usage associated with multiple carriers on an individual carrier basis.

6. The method of claim 5, further comprising:
generating a usage report resulting from said summary report, said usage report including billing point of interconnection usage for a single carrier.

7. The method of claim 1, further comprising:
discontinuing said billing point of interconnection when said traffic drops below said threshold.

8. The method of claim 1, wherein said traffic is voice data.

9. The method of claim 1, wherein said traffic is digital data.

10. A system for facilitating a billing point of interconnection in a telecommunications environment, comprising:
a server executing a monitor application and a billing point of interconnection application, said monitor application monitoring network traffic occurring on a telecommunications network;
a data repository in communication with said server, said data repository storing summary tables and usage reports;
a link to an incumbent local exchange carrier end office, said incumbent local exchange carrier servicing said telecommunications network; and
a link to a competitive local exchange carrier end office, said competitive local exchange carrier servicing said telecommunications network;
wherein said billing point of interconnection application performs:
establishing a billing point of interconnection for said telecommunications network; and
in response to said monitoring traffic, for incumbent local exchange carrier-generated traffic that exceeds a pre-defined threshold, calculating an amount of traffic usage in excess of said pre-defined threshold; wherein said calculating an amount of traffic usage reflects traffic occurring between said billing point of interconnection and a physical point of interconnection.

11. The system of claim 10, further comprising a billing application executing on said server; wherein said calculating an amount of traffic usage in excess of said pre-defined threshold includes billing said competitive local exchange carrier for dedicated transport facilities between said billing point of interconnection and a physical point of interconnection where said traffic usage is in excess of said pre-defined threshold.

12. The method of claim 1, wherein said physical point of interconnection comprises a physical telecommunications interface between said incumbent local exchange carrier and said competitive local exchange carrier.

13. The system of claim 10, wherein said pre-defined threshold comprises a specified number of minutes of use per month over a consecutive 3-month period relating to said traffic.

14. The system of claim 10, further comprising:
a summary report generated as a result of said monitoring, said summary report including billing point of interconnection usage and non-billing point of interconnection usage associated with multiple carriers on an individual carrier basis.

15. The system of claim 14, further comprising:
a usage report generated from said summary report, said usage report including billing point of interconnection usage for a single carrier.

16. The system of claim 11, wherein said billing point of interconnection is discontinued when said traffic drops below said threshold.

17. The system of claim 11, wherein said traffic is voice data.

18. The system method of claim 11, wherein said traffic is digital data.

19. A storage medium encoded with machine-readable program code for facilitating a billing point of interconnection in telecommunications environment, said program code including instructions for causing a server to implement a method, comprising:
establishing a billing point of interconnection for a communications network, said communications network serviced by an incumbent local exchange carrier and at least one competitive local exchange carrier;
monitoring traffic occurring on said communications network; and
for incumbent local exchange carrier-generated traffic that exceeds a pre-defined threshold:
calculating an amount of traffic usage in excess of said pre-defined threshold; wherein said calculating an amount of traffic usage reflects traffic occurring between said billing point of interconnection and a physical point of interconnection; and
billing said competitive local exchange carrier for dedicated transport facilities between said billing point of interconnection and a physical point of interconnection where said traffic usage is in excess of said pre-defined threshold.

20. The storage medium of claim 19, wherein said billing point of interconnection comprises a delivery point of incumbent local exchange carrier-originated traffic to said competitive local exchange carrier; wherein said competitive local exchange carrier has agreed to pay said incumbent local exchange carrier for interoffice dedicated transport.

* * * * *